March 8, 1955     H. J. WEBB ET AL     2,703,755
REPRODUCTION OF THREE DIMENSIONAL OBJECTS
Filed Oct. 10, 1950     3 Sheets-Sheet 1

INVENTORS
Herbert J. Webb
BY Richard H. Williams

March 8, 1955  H. J. WEBB ET AL  2,703,755
REPRODUCTION OF THREE DIMENSIONAL OBJECTS
Filed Oct. 10, 1950  3 Sheets-Sheet 2

INVENTORS
Herbert J. Webb
BY Richard H. Williams
atty

March 8, 1955  H. J. WEBB ET AL  2,703,755
REPRODUCTION OF THREE DIMENSIONAL OBJECTS
Filed Oct. 10, 1950  3 Sheets-Sheet 3

INVENTORS
Herbert J. Webb
BY Richard H. Williams

Greek Wells
atty.

United States Patent Office 2,703,755
Patented Mar. 8, 1955

2,703,755

REPRODUCTION OF THREE DIMENSIONAL OBJECTS

Herbert J. Webb and Richard H. Williams, Spirit Lake, Idaho

Application October 10, 1950, Serial No. 189,316

3 Claims. (Cl. 95—5)

The present invention relates to improvements in reproduction of three dimensional objects.

It is the principal purpose of this invention to provide a method and means to reproduce a likeness of a three dimensional object, both in physical proportions and in photographic detail of surface tonal gradations either in black and white (grey scale) or color. The reproduction may be to any desired scale with respect to the original, either larger or smaller.

It is a further purpose of the invention to provide a method whereby the reproduction may be made by initially taking photographic information from the original in a manner that requires a minimum lapse of time, usually less than one second, the photographic information being sufficient to require no further use of the original in the completion of the copy. It is contemplated that the entire process shall be automatic to such a degree as to require no particular skill or previous knowledge of the art in the making of the reproduction. The method lends itself particularly to the reproduction of living objects or delicate objects since no particular handling thereof is necessary and no appreciable time is required for the taking of the necessary information therefrom.

Another and more particular purpose of the invention is to provide a novel method of taking the necessary information for carving or forming a reproduction in dimensions of an object by taking photographs of the object, while lines of light are projected thereon, at an angle of 90 degrees with respect to the direction of the projection of the lines of light, the lines of light being projected successively from different stations in a common plane about the object and the photographs being taken preferably from the same plane.

In general our method, which is a combination of sculpturing and photography and which may be generally described as sculptography, includes positioning the object at the intersection of two mutually perpendicular horizontal lines. Around the object are four stations 90 degrees apart, each containing means to take three photographs of the object and means to project lines of light on the object. The object preferably is illuminated by flood lamps to provide general illumination for the taking of image photographs, from which transparencies of the surface tonal gradation (grey scale) or color result. Suitable controls are provided whereby twelve photographs may be taken by light originating in the line projectors to provide images of bands of light projected onto the object and distorted from the original straightness by the surface of the object. The remaining four photographs are taken by means of light from a flood lamp and provide photographic images of the object taken from four different view points 90 degrees apart.

The nature and advantages of the invention will appear more fully from the following description and the accompanying diagrammatic drawings illustrating the apparatus used. It should be understood however, that the drawings and description are illustrative only and are not intended to limit the invention except insofar as it is limited by the claims.

In general the present invention comprises a method and apparatus by which an object, living or inanimate, is photographed and the information photographically obtained is used to provide a scale reproduction of the original object with details of appearance by the application of photo sensitive material onto the surface of the reproduction and subsequent exposure of the photo sensitive material through images, obtained by the photographing of the original object, to reproduce the surface tonal gradations or color of the original object.

Figure 1:
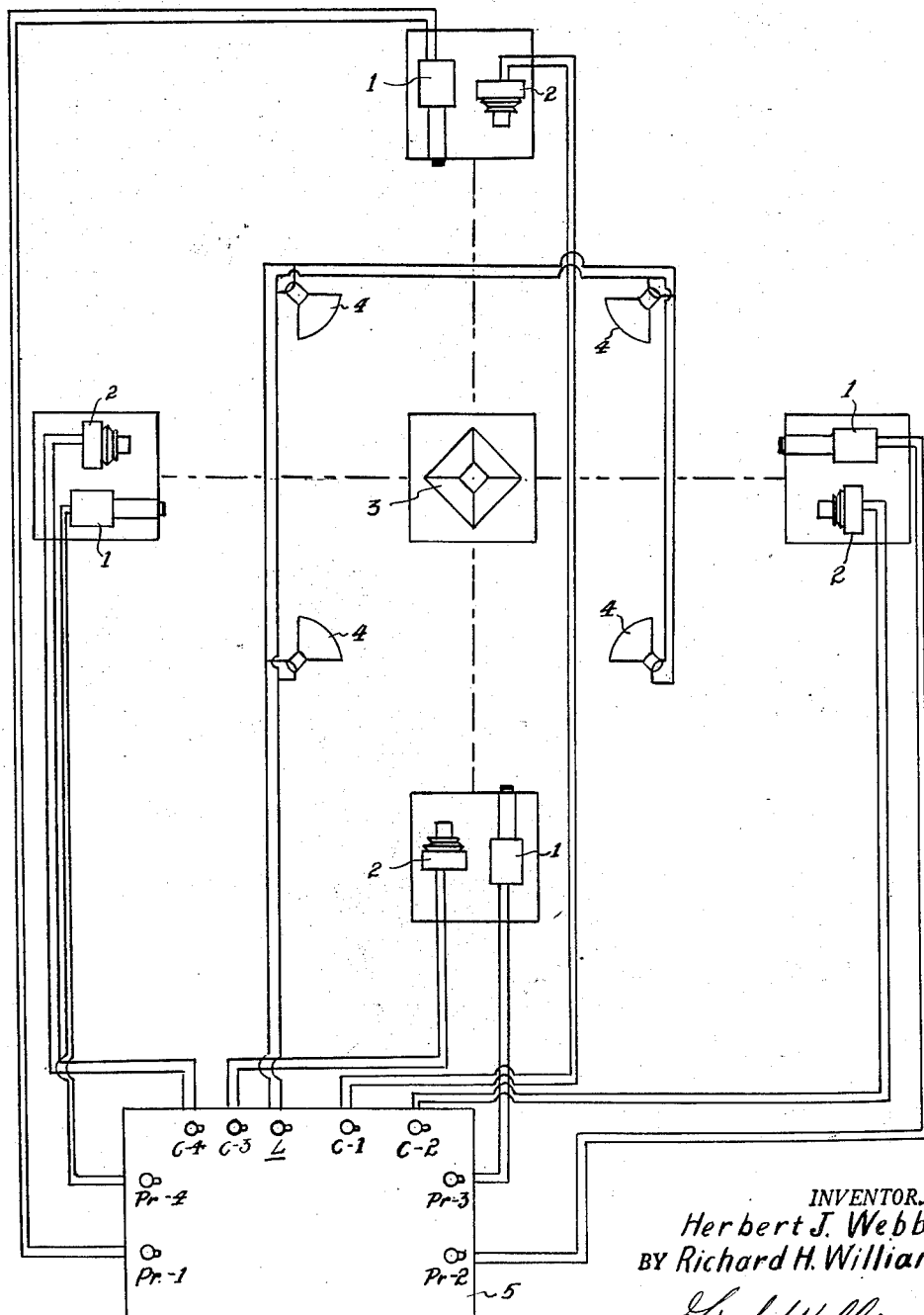
Figure 1 is a somewhat diagrammatic view of an arrangement of the mechanism necessary for taking the photographic information from which the reproduction of the original object is to be accomplished.

Specifically one particular manner of carrying out the invention will now be described in connection with the accompanying drawings. Referring to Figure 1, the object 3 to be reproduced is shown in the center of two intersecting lines at 90 degrees to each other. This object is adapted to be illuminated by a series of flood lamps 4, arranged around and above the object, the flood lamps being suitably controlled from a control box 5 so that they may be turned on and off by the operator. At equal distances from the intersection of the lines and at right angles to each other, there are four projectors, each having a light source and a grid or network of parallel lines across the path of the light beam from the projector to the object 3. These projectors are indicated by the numeral 1. At the same stations where the projectors are located there are provided cameras 2. Thus at each of the four stations provided at equidistant points about the object there is a camera and a projector. Suitable control leads are provided from each camera and each projector to the control box 5 so that the projector lights may be turned on in sequence from station 1 to 4 and the cameras may be operated. In taking the photographic information of the object 3 initially the flood lamps 4 will be turned off, the light of the projector 1 at the right hand station as shown in Figure 1, will be turned on and cameras 2 at the top and bottom stations will be operated to take two photographs of the object with the vertical lines of light projected thereon by the projector at the right hand station. Then the light of the projector at the bottom station will be turned on and the cameras 2 at the right hand and left hand stations will be operated to photograph the object with the light lines from the projector at the bottom station thereon. Next the projector at the left hand station will have its light turned on and the cameras 2 at the top and bottom stations will be operated to produce two more photographs of the object illuminated with light lines from the projector and finally the projector at the top station will have its light turned on and the cameras 2 at the right hand and left hand stations will be operated to obtain two more photographs. These eight photographs constitute the photographical record providing the information for carving or forming the reproduction of the object in shape.

To obtain a record of the surface tonal gradations or color of the object 3, the flood lights 4 are turned on and four pictures are taken by the four cameras at the stations so as to provide negatives of the object as viewed from the four positions. It is entirely possible with the control mechanism to take the twelve photographs in a very short time since only an instantaneous illumination is necessary for any single exposure. The exposed films are developed by standard photographic methods and constitute a sculptographic exposure which may be used to reproduce, at any desired size, the object 3.

The particular negatives taken with the object 3 illuminated with lines of light from the projectors are next used to make ground glass images of the contour lines of the original object, the ground glass images being enlarged or reduced to give a reproduction of the desired size. If the reproduction machine used for carving requires a printed record, the contour lines may be printed on a photographic paper with the desired enlargement or reduction. The machine illustrated in Figure 2 of the drawings utilizes the ground glass image.

Figure 2:
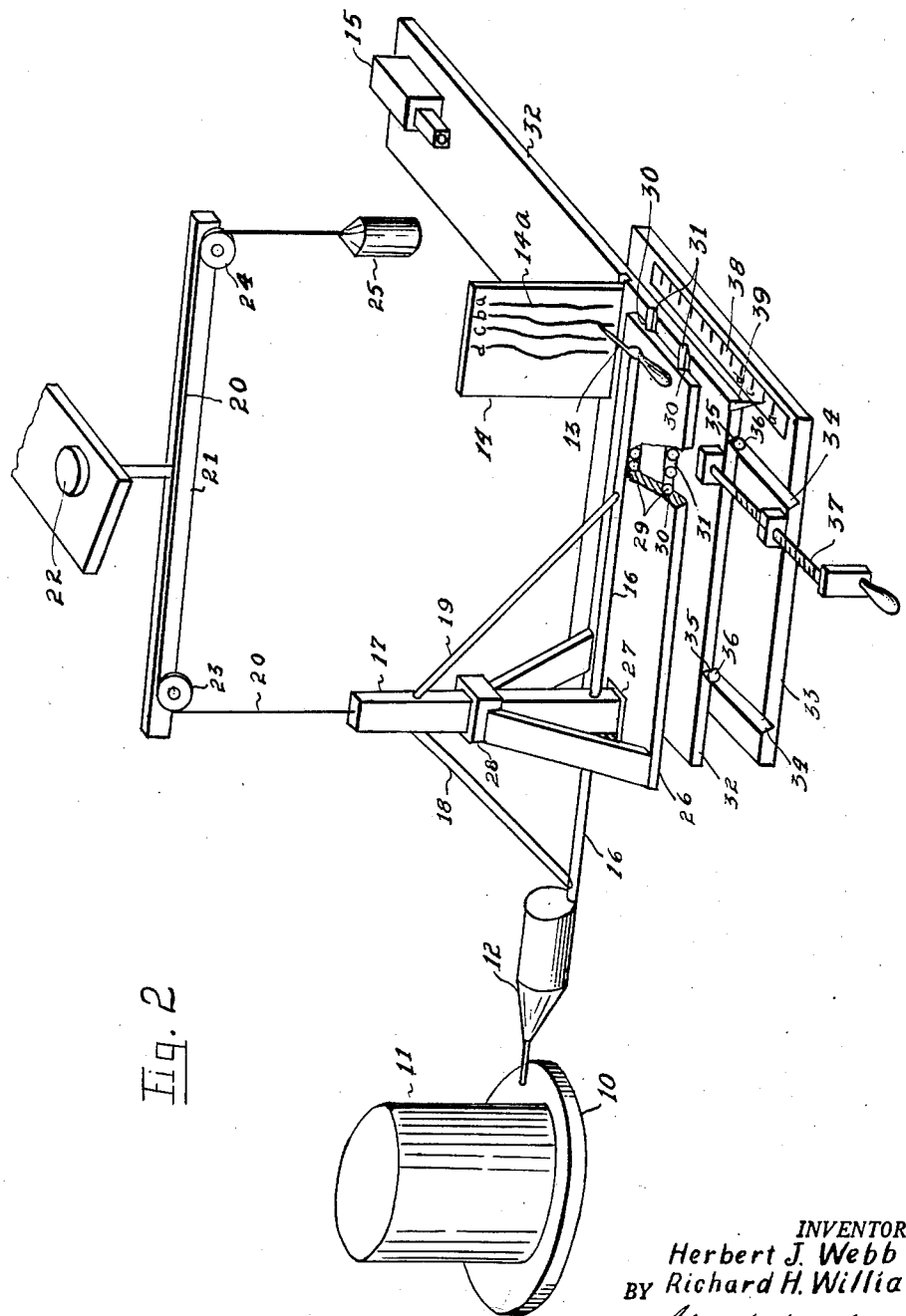
Figure 2 is a diagrammatic view in perspective of a sculpturing or carving mechanism by which a block of material may be shaped into physical reproduction of the original.
Figure 3:
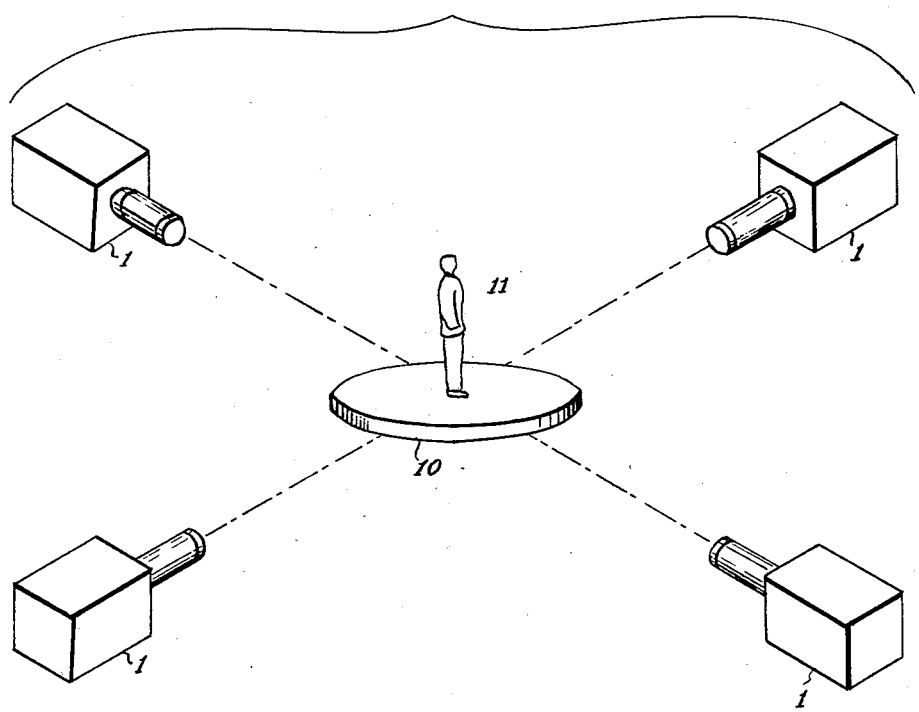
Figure 3 is a diagrammatic showing of the manner in which the reproduction may be lighted by projectors through the transparencies originally taken to expose the photo-sensitive coating thereon.

Referring now to Figure 2, this figure illustrates a carving machine for utilizing the contour line information contained on the eight photographs before mentioned, to carve a reproduction of the object photographed. The carving machine includes a turntable 10 upon which a block 11 of carving material is centered. A carving tool 12 of any suitable type is so mounted that it may be readily moved vertically and radially toward and away from the center of the block 11 in response to the movement of a stylus 13 along a reproduction of a contour line 14a upon any suitable means such as a ground glass screen 14. The ground glass screen 14 has the contour lines 14a projected thereon by a projector 15.

The tool 12 and the stylus 13 are connected by a horizontal bar 16. They are supported for vertical movement by a vertical bar 17. Two braces 18 and 19 complete the carving tool assembly. This assembly is suspended by a cable 20 from a support beam 21 which is pivotally mounted at 22. The cable 20 passes over two pulleys 23 and 24 to a counterweight 25 which equals the weight of the carving tool assembly.

While the carving tool assembly is moving vertically it must also move toward and away from the block 11 to enable the stylus 13 to follow the contour line 14a. The vertical bar 17 is maintained in true vertical position by a table 26, having guide bearings 27 and 28 for the bar 17. The table 26 is mounted to slide toward and away from the block 11 by ball bearings 29 and grooves 30—31 on the table 26 and an adjustable platform 32. The platform 32 carries the projector 15 and the screen 14.

It will be appreciated that the cutting tool must be moved laterally after tracing a contour line in order to be in position to trace the next adjacent contour line. The platform 32 is adjustably mounted on a base 33 for lateral movement by spaced grooves 34 and 35 in the base 33 and platform 32 with ball bearings 36 therebetween. The adjustment is made by a lead screw 37.

The amount of lateral movement from one contour line to the next is pre-calculated from the spacing of the grid or contour lines as projected on a plane through the center of the original object at right angles to the optical axis of the projector and the reduction or enlargement of the replica with respect to the original object. A scale 38 showing the necessary movement per contour line is placed on the base 33 to cooperate with a pointer 39 on the platform 32. For convenience the contour lines may be indexed by symbols as indicated and the scale correspondingly indexed so as to make it easy for the operator to direct the stylus 13 along the contour line 14a for which the platform 32 is adjusted.

The block 11 is carved by tracing the contour lines 14a from the eight contour line photographs. The surface of the reproduced object is then finished smooth with sand paper or other smoothing means. If the color or material of the block is such as to require coating to seal it and give proper color for an adequate base for a photo sensitive material the reproduced object is so coated. Sealing with shellac and coating with a white lacquer has given good results. The reproduced object is next coated, in a dark room, with a photo sensitive material to prepare it for receiving the surface tonal gradation or coloring. The photo sensitive material is exposed by projecting light thereon through four transparencies obtained by the photographing of the original object while fully lighted as described hereinbefore. The reproduced object is set up at the center of four projectors arranged in a circle 90 degrees apart, and light is projected thereon through the transparencies, the projection being on a scale which equals that used in making the reproduced object. After exposure the photo sensitive material is developed by ordinary photographic processes. The resulting object has the proportions and surface tonal gradations (grey scale) of the original object. If surface coloring is desired, the processes of color photography may be carried out in reproducing the surface coloring of the original object.

The foregoing description is believed to illustrate the invention and the preferred manner of carrying it out. The preferred steps consist of recording photographically the shape and proportions of the original object in contour lines by taking a series of photographs of the surface of the original object, while it is lighted by parallel lines or narrow bands of light, from stations at substantially right angles to the planes of the light bands, and, immediately before or after taking such photographs, photographing the surface of the object with uniform lighting from the same four stations, then using the contour line photographic records to guide a forming or carving machine in forming a scale replica of the original, photo sensitizing the surface of the replica, exposing the photo sensitized surface through the transparencies obtained with full lighting of the object, and developing the photo sensitive material by ordinary photographic processes.

It will be readily apparent that the detailed steps embodied in the sculptographic process outlined hereinbefore may be varied greatly. The step of making the contour line records by taking the photographs of the lines on the surface of the object at substantially 90 degrees to the plane of the light bands producing the lines, is of particular advantage. It makes it necessary to use any rectification to obtain true to scale contour lines. It is recognized, however, that contour lines may be obtained by photographs taken at less than 90 degrees to the axis of light projection and corrected by known processes, also that a reproduction in shape and proportion of the original may be attained by other means.

We have discovered that, after proper rectification of contour lines not taken at 90 degrees to the projection line, each contour line on a given negative, although to perfect scale, is different in size from its neighbors. We correct for this difference in size by linking the projector 15 to the lead screw 37 in such a way that the distance from the projector 15 to the screen 14 is changed an amount sufficient to compensate for the change in size of the new contour line from the previously used one. The correction can also be made in the cutting tool or stylus mounting so as to give the same result by using a pantograph system with a variable linkage and controlling the variable arm from the lead screw 37.

Where the taking of all the photographic information from one horizontal plane is insufficient, additional cameras above and below the main image cameras, may be used. In certain instances it may also be necessary to take contour line information in a third dimension, that is, from above or below the object.

While the preferred form of the invention places the object to be reproduced at the center of a group of four photographing units, it will be appreciated that more units or fewer units may be used. It is possible to use one projector and one camera, turning the object a quarter turn after taking the necessary views. Also it is possible to use a slit camera and record the surface image information on a continuously moving film as the object is rotated on a turntable. When the reproduced object is photo sensitized it can be exposed by a slit projector using the negative obtained by the slit camera while the reproduced object is rotated on a turntable.

By use of the proper material and the preferred form of the invention, it is possible to prepare a hollow transparent object, and to photo sensitize the interior surface and reproduce the surface tonal gradation coloring in this way. One simple way is to prepare the initial replica of shape in sections, so it may be collapsed, then to form a transparent shell thereon, remove the replica and coat the interior of the shell with a photo sensitive coating. A single carved replica can be used to reproduce a number of copies by this method or by any well known molding method. These copies can then be given photo sensitized coatings and exposed through the image negatives and developed to produce surface tonal gradations or colors.

It is recognized that the time of taking of the photographs necessary for carving information may be shortened by the use of color filters on various of the cameras, light sources and grid projectors so that several of the exposures could be taken simultaneously.

It is believed that the nature and advantages of our invention will be apparent from the foregoing description. Having thus described our invention, we claim:

1. A method of reproducing a likeness of an object which comprises lighting the object by projecting lines of light thereon, photographing first the entire surface thereof on which the lines are projected while so lighted from two view points offset angularly about the object as a center in opposite directions from the source of the line of light, then uniformly illuminating the subject without the lines and further photographing the entire surface of the object while it is uniformly illuminated from the same location as the first photographing, using a reproduction, on a desired scale, of the contour lines obtained by the first photographing to guide a forming tool in making a reproduction to scale of the original object, then coating the reproduction with a photo sensitive coating, exposing the surface thereof to light projected through photographic transparencies obtained by the second photographing and developing the photo sensitive materials so exposed.

2. A method of reproducing a likeness of an object which comprises lighting the object by projecting lines of light thereon, photographing first the entire surface thereof on which the lines are projected while so lighted from two view points offset 90 degrees angularly about the object as a center in opposite directions from the source of the line of light, then uniformly illuminating the subject without the lines and further photographing the entire surface of the object while it is uniformly illuminated from the same location as the first photographing, using a reproduction, on a desired scale, of the contour lines obtained by the first photographing to guide a forming tool in making a reproduction to scale of the original object, then coating the reproduction with a photo sensitive coating, exposing the surface thereof to light projected through photographic transparencies obtained by the second photographing, and developing the photo sensitive material so exposed.

3. A method of reproducing a likeness of an object which comprises recording photographically the shape and proportions of the original object in contour lines by taking a series of photographs of each quarter of the surface of the original object, while it is lighted by parallel bands of light, from stations at substantially right angles to the planes of the light bands in both directions, then photographing the surface of the object, using uniform illumination, by taking a second series of photographs from the same stations that the first series of photographs were taken from, using the contour line photographic records to guide a forming device and thereby forming a scale replica of the original object, photo sensitizing the surface of the replica, exposing the photo sensitized surface through the transparencies obtained with full lighting of the original object and developing the photo sensitive material, thereby producing the replica with the same shape, proportions and surface tonal gradations as the original.

References Cited in the file of this patent
UNITED STATES PATENTS

| | | |
|---|---|---|
| 891,013 | Smith | June 16, 1908 |
| 1,596,458 | Schiesari | Aug. 17, 1926 |
| 2,015,457 | Morioka | Sept. 24, 1935 |
| 2,069,647 | Tour | Feb. 2, 1937 |
| 2,309,627 | Cooke | Feb. 2, 1943 |
| 2,350,796 | Morioka | June 6, 1944 |
| 2,491,386 | Miller et al. | Dec. 13, 1949 |
| 2,643,598 | Carroll | June 30, 1953 |

FOREIGN PATENTS

| | | |
|---|---|---|
| 4,671 | Great Britain | of 1882 |